(12) United States Patent
Allen

(10) Patent No.: US 12,328,345 B1
(45) Date of Patent: Jun. 10, 2025

(54) CALL SETUP SIMPLIFICATION FOR INTERNET CLIENTS TO ESTABLISH MEDIA SESSIONS WITH A SERVING IMS NETWORK

(71) Applicant: T-Mobile Innovations LLC, Overland Park, KS (US)

(72) Inventor: Mark Daniel Allen, Renton, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 103 days.

(21) Appl. No.: 17/407,432

(22) Filed: Aug. 20, 2021

(51) Int. Cl.
| | |
|---|---|
| *G06F 15/16* | (2006.01) |
| *H04L 65/1016* | (2022.01) |
| *H04L 65/1046* | (2022.01) |
| *H04L 65/1069* | (2022.01) |
| *H04M 3/428* | (2006.01) |
| *H04M 3/58* | (2006.01) |

(52) U.S. Cl.
CPC ...... *H04L 65/1069* (2013.01); *H04L 65/1016* (2013.01); *H04L 65/1046* (2013.01); *H04M 3/4283* (2013.01); *H04M 3/58* (2013.01)

(58) Field of Classification Search
CPC ............. H04L 65/1069; H04L 65/1016; H04L 65/1046; H04M 3/4283; H04M 3/58
USPC ....................................................... 709/224
See application file for complete search history.

(56) References Cited

U.S. PATENT DOCUMENTS

| | | | | |
|---|---|---|---|---|
| 7,944,862 B2* | 5/2011 | Taylor | ................. | H04L 65/1106 370/352 |
| 8,320,534 B2* | 11/2012 | Kim | ..................... | H04M 7/006 455/445 |
| 8,451,728 B2* | 5/2013 | Todd | ..................... | H04L 47/283 370/352 |
| 8,542,580 B2* | 9/2013 | Li | ........................... | H04L 63/18 370/352 |
| 8,543,667 B2* | 9/2013 | Hluchyj | ................ | H04W 28/18 709/219 |
| 8,898,317 B1* | 11/2014 | Armstrong | .......... | H04L 65/1069 709/228 |
| 9,172,655 B1* | 10/2015 | Dropps | ............... | H04L 47/6215 |
| 10,091,254 B2* | 10/2018 | Kennedy | ............. | H04L 61/2567 |
| 10,135,806 B2* | 11/2018 | Saridaki | .................. | H04L 65/65 |

(Continued)

FOREIGN PATENT DOCUMENTS

| | | | | |
|---|---|---|---|---|
| WO | WO-2006073488 A1 * | 7/2006 | ......... | H04L 65/1006 |
| WO | WO-2016150213 A1 * | 9/2016 | ......... | H04L 65/1023 |

*Primary Examiner* — Moustafa M Meky
(74) *Attorney, Agent, or Firm* — Shook, Hardy & Bacon L.L.P.

(57) ABSTRACT

Call setup and management for internet clients is simplified by splitting negotiation of media characteristics for the call into separate negotiations with an originating device and a destination device. Based on an initiation of a call from an originating device (e.g., an originating internet client) to a destination device (e.g., a destination internet client), a first media stream may be negotiated and opened between the originating device and an access node in communication with an internet protocol multimedia system ("IMS") or other communications network. A second media stream may be negotiated and opened between the access node and the destination device through the IMS, and this negotiation may be masked from the originating device. The access node may connect the call by connecting the first media stream and the second media stream.

20 Claims, 7 Drawing Sheets

(56) References Cited

U.S. PATENT DOCUMENTS

| | | | | |
|---|---|---|---|---|
| 10,212,237 | B2* | 2/2019 | Tarricone | H04L 65/1104 |
| 10,298,628 | B2* | 5/2019 | Stahl | H04L 65/1069 |
| 10,594,744 | B2* | 3/2020 | Hori | H04L 65/1016 |
| 10,880,342 | B2* | 12/2020 | Perreault | H04L 65/1094 |
| 10,997,006 | B2* | 5/2021 | Ajima | G06F 11/0793 |
| 2003/0229900 | A1* | 12/2003 | Reisman | H04N 21/422 |
| | | | | 348/E7.071 |
| 2007/0177616 | A1* | 8/2007 | Jabri | H04N 21/2662 |
| | | | | 370/401 |
| 2011/0029620 | A1* | 2/2011 | Bonforte | H04L 67/306 |
| | | | | 709/204 |
| 2012/0185906 | A1* | 7/2012 | Doets | H04L 65/1069 |
| | | | | 725/126 |
| 2013/0151623 | A1* | 6/2013 | Weiser | H04L 65/104 |
| | | | | 709/205 |
| 2013/0265385 | A1* | 10/2013 | Wang | H04L 65/1106 |
| | | | | 348/14.09 |
| 2014/0189067 | A1* | 7/2014 | Gratton | G06F 21/10 |
| | | | | 709/219 |
| 2015/0135214 | A1* | 5/2015 | Reisman | H04H 60/35 |
| | | | | 725/37 |
| 2019/0075331 | A1* | 3/2019 | Coburn, IV | H04N 21/4363 |
| 2019/0235947 | A1* | 8/2019 | Ajima | H04L 1/00 |
| 2019/0289042 | A1* | 9/2019 | Perreault | H04L 65/403 |
| 2020/0329088 | A1* | 10/2020 | Oyman | H04L 65/1016 |
| 2023/0026981 | A1* | 1/2023 | Pranger | G06F 3/0484 |

* cited by examiner

CALL SETUP SIMPLIFICATION FOR INTERNET CLIENTS TO ESTABLISH MEDIA SESSIONS WITH A SERVING IMS NETWORK

SUMMARY

The present disclosure is directed, in part to call setup and management techniques for internet clients, substantially as shown and/or described in connection with at least one of the figures, and as set forth more completely in the claims.

In conventional communications systems, when an originating internet client makes a call to a destination internet client, the originating and destination internet clients negotiate media characteristics of the call through a telecommunication provider's packet-switched network (e.g., an IP Multimedia Subsystem). During a typical call setup and call execution, several Session Description Protocol (SDP) offer/answer cycles take place, requiring the internet clients to process and generate multiple responses-a resource-intensive and time-costly process. Conventionally, an access node for the packet-switched network would serve as a pass-through device for the originating internet client to negotiate (and re-negotiate) media characteristics for the call and for any updates to the call (e.g., call transfer, call hold/resume, adding/removing video, forking). By using a particular methodology that allows the access node to negotiate with the destination internet client and mask that negotiation from the originating internet client, computational burden is off-loaded from the originating internet client, enabling more lightweight and platform-agnostic clients.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended as non-limiting examples, wherein.

DETAILED DESCRIPTION

Figure 1:
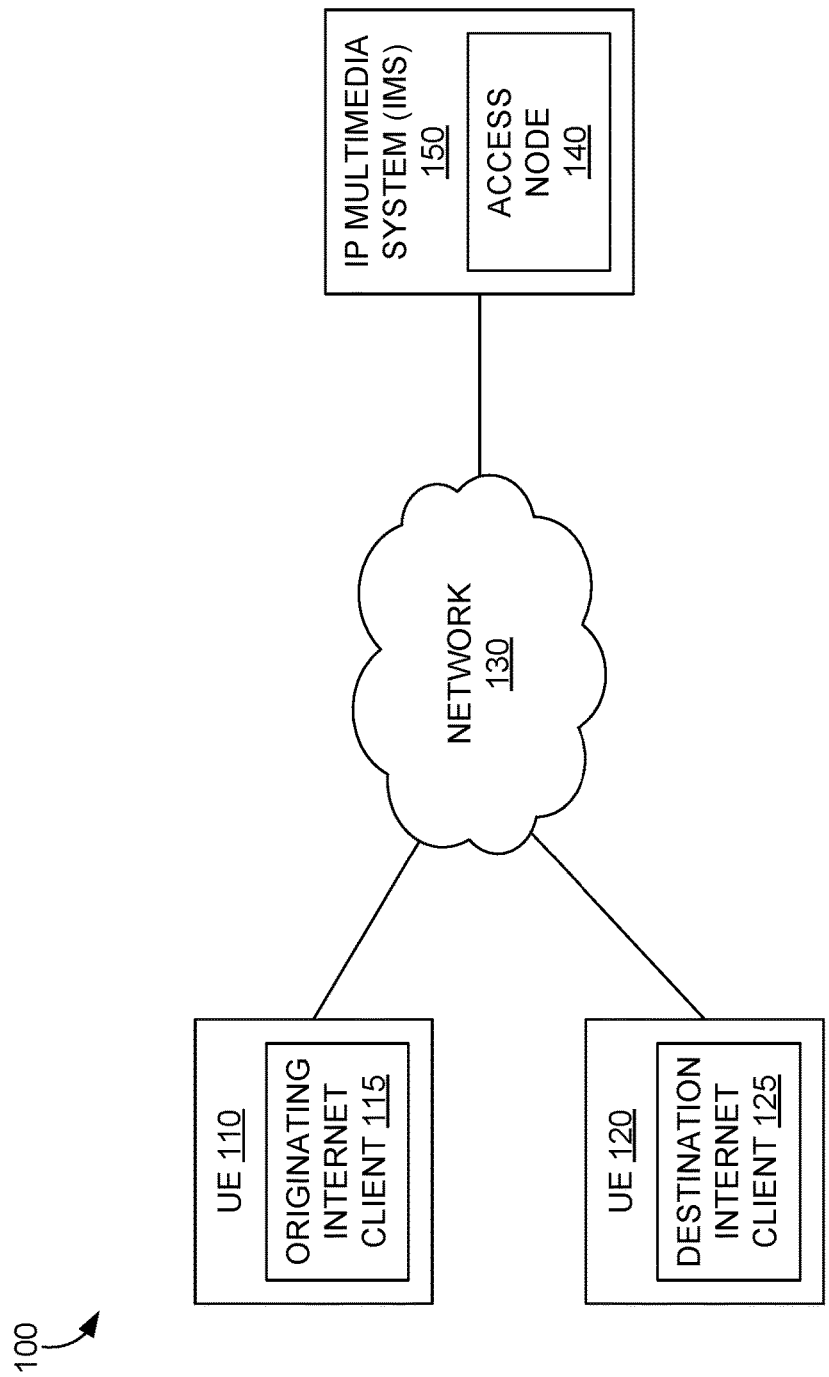
FIG. 1 depicts an example of a network environment, in accordance with certain embodiments.

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

By way of background, network operators are increasingly expected to support new call functionality for new devices while operating legacy communications networks (e.g., packet-switched networks) that use Session Description Protocol (SDP) negotiations. Mobile communication clients are evolving away from traditional telephony connection methods such as Voice over Long-Term Evolution (VOLTE), as internet clients such as web browsers, over-the-top applications, and smart home devices are on the rise. Traditionally, packet-switched networks such as IP Multimedia Systems (IMSs) use SDP negotiations to setup and manage calls for internet clients, so internet clients are typically required to integrate into the SDP offer/answer cycle in order to make internet calls. During a typical call setup and execution between internet clients, the internet clients will negotiate the media characteristics for the call over several SDP offer/answer cycles. Furthermore, the internet clients often re-negotiate the media characteristics for any updates to the call (e.g., call transfer, call hold/resume, adding/removing video, forking). Conventionally, this negotiating puts heavy burden on internet clients, as offers and counter-offers are exchanged back and forth through the IMS, and the internet clients are required to process and generate responses, an expensive process in terms of computational burden, network usage, and time, particularly for internet clients on mobile devices or smart devices.

In order to solve these problems with conventional call setup and management techniques, the present disclosure is directed to systems, methods, and computer readable media that simplify call setup and management for internet clients. In some embodiments, network functions are configured to split the negotiation of media characteristics for a call or other media session into separate negotiations with the originating client and with the designation client. In an example implementation, an access node of a communications network negotiates a first media stream with an originating internet client, then negotiates a separate media stream with the destination internet client, while masking the latter negotiation from the originating internet client. Once the separate media streams have been setup, the access node can connect the two streams to connect the call. By offloading the responsibility for, and masking, negotiations on the network with the destination internet client, the first media stream can be maintained without disruption during the negotiations. Furthermore, computational burden is off-loaded from the originating internet client, simplifying connection setup and management, and thereby enabling a flexible, lightweight, and/or platform-agnostic internet client.

Accordingly, a first aspect of the present disclosure is directed to a method of establishing a media session between an originating device and a destination device. The method comprises connecting a first media stream of the media session through an internet connection to the originating device using a first set of media stream characteristics. The method further comprises negotiating, with the destination device through a communications network, a second set of media stream characteristics of a second media stream of the media session. The method further comprises connecting the second media stream to the destination device, through the communications network, using the second set of media stream characteristics. The method further comprises connecting the first media stream and the second media stream.

A second aspect of the present disclosure is directed to a system comprising one or more hardware processors and a media proxy component. The media proxy component is configured to use the one or more hardware processors to perform operations comprising opening, based on an initiation of a call from a first internet client to a second internet client, a first media stream over an internet connection between the first internet client and the media proxy component. The operations further comprise negotiating and opening a second media stream between the media proxy component and the second internet client without renegotiating the first media stream. The operations further comprise connecting the call by connecting the first media stream and the second media stream.

A third aspect of the present disclosure is directed to one or more computer storage media storing computer-useable instructions that, when used by one or more computing devices, cause the one or more computing devices to perform operations. The operations comprise opening, based on an initiation of a call from an originating device to a destination device, a first media stream between the originating device and an access node in communication with an internet protocol multimedia system ("IMS"). The operations further comprise masking, from the originating device, a negotiation through the IMS of a second media stream between the access node and the destination device. The operations further comprise opening the second media stream between the access node and the destination device through the IMS. The operations further comprise connecting, by the access node, the call by connecting the first media stream and the second media stream.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, device, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 600 shown in FIG. 6. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and/or wired components that provide wireless communications service coverage to one or more UE devices. The network may comprise one or more base stations, i.e. cell sites equipped with radio equipment, a backhaul network connecting one or more base stations to a core network, a database, a power supply, sensors, and other components not discussed herein, in various embodiments.

The terms "base station" and "cell site" may be used interchangeably herein to refer to a defined wireless communications coverage area (i.e., a geographic area) serviced by a base station. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE devices that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," "user device," and "UE device" are used interchangeably to refer to a device employed by an end-user that communicates using a network. In some cases, UE includes one or more antenna coupled to a radio for exchanging (e.g., transmitting and receiving) transmissions with a nearby base station (e.g., via an antenna array of the base station). In some cases, UE includes a device that connects to the Internet or some other network through a WiFi and/or wired connection. In some embodiments, UE can include any variety of devices, such as a personal computer, a laptop computer, a tablet, a notebook, a mobile phone, a smart phone, a personal digital assistant, an Internet of Things (IoT) or smart device (e.g., a smart speaker), a wearable device, a fitness tracker, and/or any other device capable of communicating using one or more resources of the network and one or more resident applications or other code. UE may include components such as software and hardware, a processor, a memory, a display component, a power supply or power source, a speaker, a touch-input component, a keyboard, and the like. In some embodiments, some of the UE discussed herein may include current UE capable of using 5G and having backward compatibility with prior access technologies, current UE capable of using 5G and lacking backward compatibility with prior access technologies, and legacy UE that is not capable of using 5G.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

FIG. 1 illustrates an example of a network environment 100 suitable for use in implementing embodiments of the present disclosure. Network environment 100 is but one example of a suitable network environment and is not intended to suggest any limitation as to the scope of use or functionality of the disclosure. Neither should network environment 100 be interpreted as having any dependency or requirement relating to any one or combination of components illustrated.

At a high level, network environment 100 facilitates setup, execution, and management for real-time media sessions, such as voice calls, video calls, screen-share sessions, and other media sessions between internet clients on various UE via network 130. In the embodiment illustrated in FIG. 1, network environment 100 includes UE 110, UE 120, network 130, access node 140, and IMS 150.

In some embodiments, UE 110 and/or UE 120 take the form of a wireless or mobile device capable of communication via network 130. For example, UE 110 and/or UE 120 may be a mobile device, smart device (e.g., smart speaker), laptop computer, or other computing device capable of communication via a telecommunications network. In some embodiments, UE 110 and/or UE 120 is a mobile computing device that accesses the Internet over a 1× circuit voice network, a 3G network (e.g., CDMA, CDMA 2000, WCDMA, GSM, UMTS, a 4G network (LTE, WiMAX, HSDPA), a 5G network, a 6G network, or any other type of network. In some embodiments, UE 110 and/or UE 120 is a computing device (e.g., a laptop, an IoT device, a smart device) that that accesses the Internet via a WiFi and/or a wired connection.

In the embodiment illustrated in FIG. 1, UE 110 includes originating internet client 115, and UE 120 includes destination internet client 125. Generally, originating internet client 115 and/or destination internet client 125 may be any application capable of placing, receiving, and/or facilitating Internet calls or some other type of streaming media session between devices. In some embodiments, originating internet client 115 and/or destination internet client 125 are a stand-alone application, a mobile application, a web application, an add-on, or the like. In some implementations, the application comprises a web application, which may run in a web browser, and may be hosted at least partially server-side. In addition, or instead, the application may comprise a dedicated application. In some cases, the application may be integrated into an operating system (e.g., as a service), a server (e.g., a remote server), and/or some other device or component.

In some embodiments, network 130 and/or IP Multimedia System (IMS) 150 include and/or link to some or all of a communications network, such as a telecommunications network and/or the Internet. Network 130 and/or IMS 150 may include any number of devices and components, such as base stations, servers, switches, relays, amplifiers, databases, nodes, and/or others which are not shown so as to not confuse other aspects of the present disclosure. Those devices and components may provide connectivity in a variety of implementations. Furthermore, network 130 and/or IMS 150 may be utilized in a variety of manners, such as a single network, multiple networks, or as a network of networks, but, ultimately, are shown as simplified as possible to avoid the risk of confusing other aspects of the present disclosure.

In some embodiments, network 130 is structured to connect subscribers to one or more systems or networks (e.g., IMS 150) operated by a service provider or a plurality of service providers. Additionally or alternatively, some or all of network 130 (and/or IMS 150) may be associated with a specific telecommunication provider that provides services (e.g., 5G, voice, Internet, etc.) to various UE (e.g., UE 110, UE 120). For example, UE 110 and/or UE 120 may be associated with subscribers to one or more telecommunication service providers, in which UE 110 and/or UE 120 are registered or subscribed to receive voice and/or data services over network 130. Network 130 may include any communications network providing voice and/or data service(s), such as, for example, a 1× circuit voice, a 3G network (e.g., CDMA, CDMA 2000, WCDMA, GSM, UMTS, a 4G network (LTE, WiMAX, HSDPA), a 5G network, or 6G network.

At a high level, IMS 150 (sometimes referred to as a core network or an IMS core) includes various components for delivering internet protocol (IP) streaming media services, such as Voice over LTE (VOLTE), Wi-Fi Calling (VoWIFI), Video over LTE (ViLTE), SMS/MMS over WiFi and LTE, USSD over LTE, Rich Communication Services (RCS), and/or other streaming media services. IMS 150 (and/or network 130) may include, link, provide access to, and/or connect calls or other media sessions through one or more networks such as a packet-switched network, a publicly-switched telephone network, a fixed line network, and/or other types of networks. In some cases, IMS 150 includes or provides access to one or more application servers or other functions, nodes, servers, and/or other components that provide various types of data and/or services. In an example embodiment, when a user operating originating internet client 115 on UE 110 initiates a call or some other type of media session with destination internet client 125 on UE 120, IMS 150 connects the originating internet client 115 and destination internet client 125 through network 130 using Session Description Protocol (SDP) to negotiate media characteristics for the call, and using Session Initiation Protocol (SIP) to deliver a corresponding media stream. Although some embodiments are described as using an IMS, IP, SDP, and SIP, any suitable communications network and/or protocol may be implemented and used within the scope of the present disclosure.

In order to facilitate a call or other media session, an access node (or core access node) associated or in communication with IMS 150 (e.g., access node 140) may provide access to IMS 150 (e.g., for originating internet client 115), perform call or connection setup or management, and/or perform one or more intermediary functions between an originating and destination client. For example, in some cases, access node 140 negotiates (and re-negotiates) media characteristics, masks negotiations from an originating client, and/or acts as a media endpoint that proxies media for a client. Although in FIG. 1, access node 140 is illustrated as part of IMS 150, this need not be the case.

In some embodiments, access node 140 performs one or more functions—or coordinates with one or more functions or modules of IMS 150—to facilitate a call or other media session. For example, in an implementation that includes a 3GPP 5G architecture, IMS 150 may include at least one call session control function such as a proxy call session control function (P-CSCF), a serving call session control function (S-CSCF), and/or an interrogating call session control function (I-CSCF). In this example, access node 140 may be in communication with a P-CSCF and/or perform one or more functions of a P-CSCF (e.g., access node 140 comprises the P-CSCF). In some cases, call session control functions of IMS 150, such as P-CSCF and S/I CSCF are configured to permit UE 110 to place a call or connect some other media session to a circuit switched domain such as a publically switched telephone network (PSTN) (e.g., a non-VONR/VOLTE voice call) or to a second UE (e.g., UE 120) via one or more other IMS networks (e.g., a VoNR or VOLTE call). In some embodiments, one or more call session control functions may be replaced by one or more components (e.g., service or media gateways) that are configured to support interworking between an IP based transport network accessible by UE 110 and a circuit switched domain or other IP based transport network accessible by a destination telephonic device. These are just a few example implementations, and other implementations are contemplated within the scope of the present disclosure.

Having described network environment 100 and components operating therein, it will be understood by those of ordinary skill in the art that network environment 100 is but one example of a suitable network and is not intended to limit the scope of use or functionality of aspects described herein. Similarly, network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
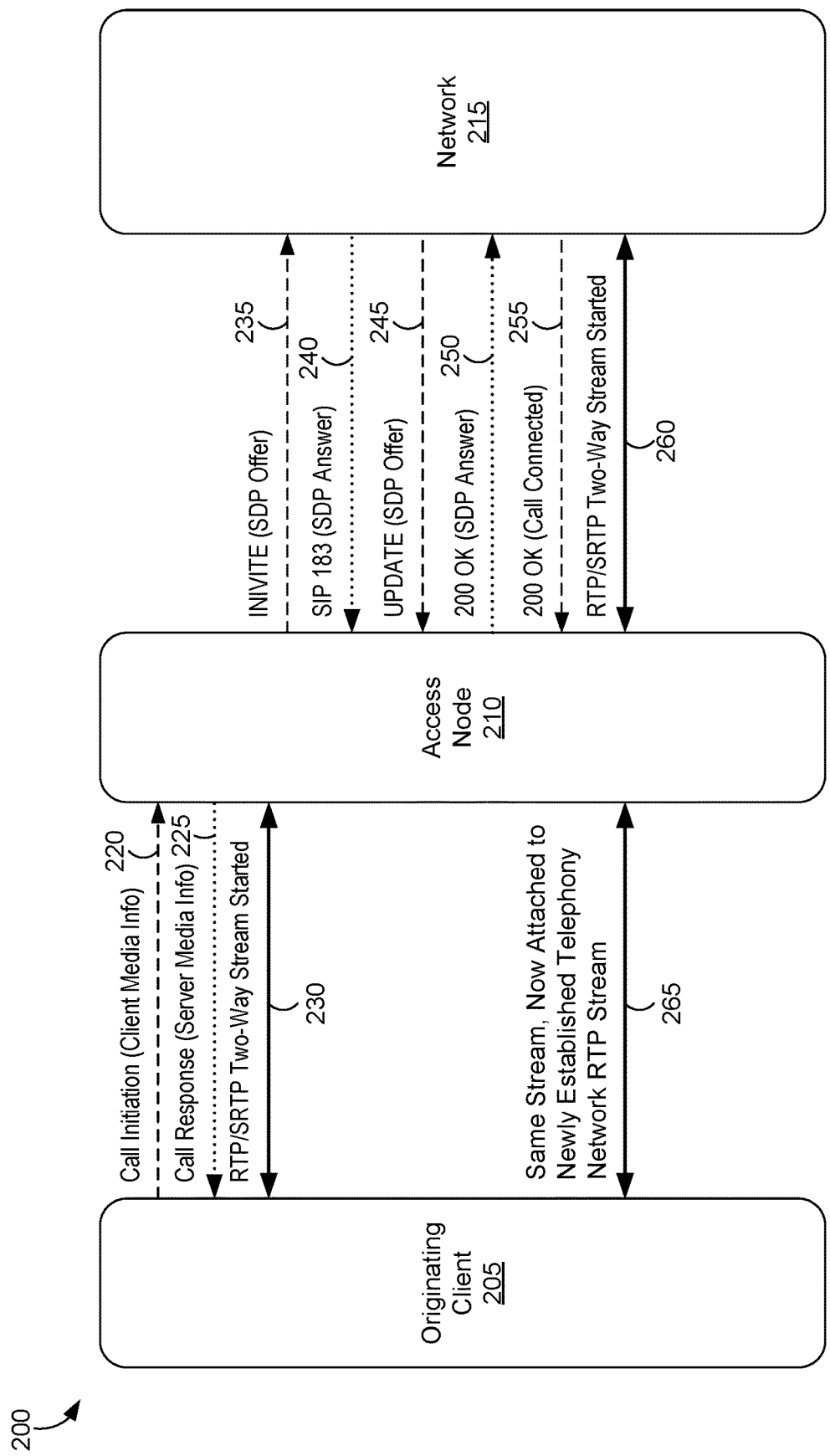
FIG. 2 illustrates a call flow diagram of an example call setup initiated by an originating client, in accordance with certain embodiments.

Turning now to FIG. 2, FIG. 2 illustrates a call flow diagram of an example call setup initiated by an originating client 205, in accordance with certain embodiments. More specifically, call flow 200 of FIG. 2 illustrates an example implementation using SDP to negotiate media characteristics for an Internet call or other streaming media session. Note that in other implementations, other suitable techniques for negotiating media characteristics besides SDP can be implemented. Furthermore, the interactions illustrated in call flow 200 need not be exhaustive, and other interactions may additionally or alternatively occur among the components illustrated in FIG. 2 and/or other components that are not illustrated. In FIG. 2, call flow 200 occurs among originating client 205 which initiates an Internet call or other streaming media session with a destination client (not illustrated in FIG. 2), access node 210 which performs one or more call or connection setup functions, and network 215 which connects to and relays communications with the destination client. In an example implementation, originating client 205 of FIG. 2 corresponds to originating internet client 115 of FIG. 1, access node 210 of FIG. 2 corresponds to access node 140 of FIG. 1, and network 215 of FIG. 2 corresponds to IMS 150 of FIG. 1.

At a first step 220, originating client 205 communicates a call initiation message to access node 210. In some embodiments, the call initiation message includes or otherwise identifies some representation of one or more proposed media characteristics for a call or other media session between originating client 205 and a destination client, including media characteristics supported by originating client 205. Example media characteristics may include media ports, open ports, destination IP address, audio codec used for sending audio, media requirements of originating client 205, and/or others. In some embodiments that use SDP, the call initiation message comprises an SDP offer.

In some embodiments, access node 210 acts at least in part as a server for originating client 205, negotiating and opening a media stream between originating client 205 and access node 210. For example, at a second step 225, access node 210 communicates a call response message to originating client 205. In some embodiments, the call response message includes or otherwise identifies some representation of one or more proposed media characteristics for the call or other media session, including media characteristics supported by access node 210. Example media characteristics may include media ports, open ports, destination IP address, audio codec used for sending audio, bitrate, media requirements of access node 210, and/or others. In some embodiments that use SDP, the call response message comprises an SDP answer.

In some embodiments, access node 210 and originating client 205 are designed, owned, operated, and/or controlled by a common entity. For example, originating client 205 may include an application or a software development kit (SDK) designed by the same entity that designed access node 210. As a result, that entity can design originating client 205 and access node 210 to support the same media characteristics, so the negotiation between these components is simple (e.g., a single offer/answer). Note that in this situation, the common entity that designed, owns, operates, and/or controls access node 210 and originating client 205 may, but need not, be the same entity that designed, owns, operates, and/or controls network 215.

At a third step 230, upon the conclusion of the negotiation between access node 210 and originating client 205, access node 210 and originating client 205 open up a media stream using the negotiated media characteristics. In the embodiment illustrated in FIG. 2, the media stream is a two-way stream that uses Real-time Transport Protocol (RTP) and/or Secure Real-time Transport Protocol (SRTP).

Once the media stream between access node 210 and originating client 205 is opened, access node 210 negotiates and opens a media stream with the destination client through network 215. In some embodiments, network 215 operates at least in part as a relay between access node 210 and the destination client. In FIG. 2, the interface between access node 210 and (one or more components of) network 215 is illustrated, while the interface between network 215 and the destination client is omitted.

In some embodiments, the negotiation between access node 210 and the destination client (through network 215) may include any number of offer and answer cycles. For example, in the example illustrated in FIG. 2, at a fourth step 235, access node 210 communicates a call invitation message targeting the destination client to network 215, which passes the call invitation message to the destination client. The designation client then communicates an invitation response message back through network 215, and at a fifth step 240, network 215 communicates the invitation response message to access node 210. In some embodiments that use SDP, the call invitation message comprises an SDP offer, and the invitation response message comprises an SDP answer. In FIG. 2, steps 235 and 240 are illustrated as a single offer and answer cycle. However, in some cases, multiple offers and answers are exchanged between access node 210 and the destination client (through network 215) in the course of negotiating media characteristics for a stream between access node 210 and the destination client (through network 215). In some embodiments, upon the conclusion of this negotiation between access node 210 and the destination client, access node 210 and the destination client open up a media stream (e.g., an RTP/SRTP two-way stream) through network 215 using the negotiated media characteristics, and access node 210 connects the originating client-facing and destination client-facing streams (not illustrated). In some cases, this state corresponds to a ringing state or some other initial connection state.

Continuing with the example illustrated in FIG. 2, any number of state changes (e.g., SIP updates) may occur that necessitate a renegotiation of media characteristics for the connection between access node 210 and the destination client. In a simple example, a user of the destination client may answer the call, in which case, the destination client may communicate a response message through network 215 to access node 210. In some instances, the response message may not propose to change any of the media characteristics of the media stream. For example, the response message may be an HTTP 200 OK status code received by access node 210 at step 255. In other instances, the response message may propose to change the media characteristics of the media stream. For example, the response message may represent a new offer (e.g., an SDP offer) received by access node 210 at step 245, which triggers a corresponding response message (e.g., an SDP answer) from access node 210 at step 250. In FIG. 2, steps 245 and 250 are illustrated as a single offer and answer cycle. However, in some cases, multiple offers and answers are exchanged between access node 210 and the destination client (through network 215) in the course of negotiating updated media characteristics for an updated stream between access node 210 and the destination client (through network 215). In some embodiments, upon the conclusion of this negotiation between access node 210 and the destination client, the destination client sends a response message (e.g., an HTTP 200 OK status code) to access node 210 though network 215, access node 210 receives the response message at step 255, access node 210 and the destination client open up a new (e.g., updated) media stream (e.g., an RTP/SRTP two-way stream) through network 215 using the negotiated media characteristics at step 260, and access node 210 connects the originating client-facing and destination client-facing streams at step 265. In some cases, this state corresponds to a call connected state.

In the foregoing discussion, the state change that triggered a renegotiation of media characteristics was a user of the destination client answering the call. Additionally or alternatively, any number of state changes may trigger a renegotiation and setup of a new (updated) media stream between access node 210 and the destination client, such as a call transfer, a call being placed on hold or resumed, music-while-ringing being initiated or terminated, video being added or removed from a call, a call being forked onto multiple devices, and/or other scenarios. Upon (e.g., the destination client) detecting a proposed state change, steps 245-265 may be repeated to open a new stream with the destination client and connect the new stream to the existing stream with originating client 205.

In contrast to previous call flows, in various embodiments, rather than access node 210 acting as a pass-through for a negotiation between originating client 205 and the destination client, access node 210 splits the negotiation into separate negotiations. The first negotiation and setup (e.g., steps 220-230) occurs between originating client 205 and access node 210, and the second negotiation and setup (e.g., steps 235-260) occurs between access node 210 and the destination client (through network 215) independently of originating client 205. Furthermore, in some embodiments, access node 210 masks the negotiation between access node 210 and the destination client from originating client 205, thereby offloading from originating client 205 responsibility for call setup and management with the destination client.

Figure 3A:
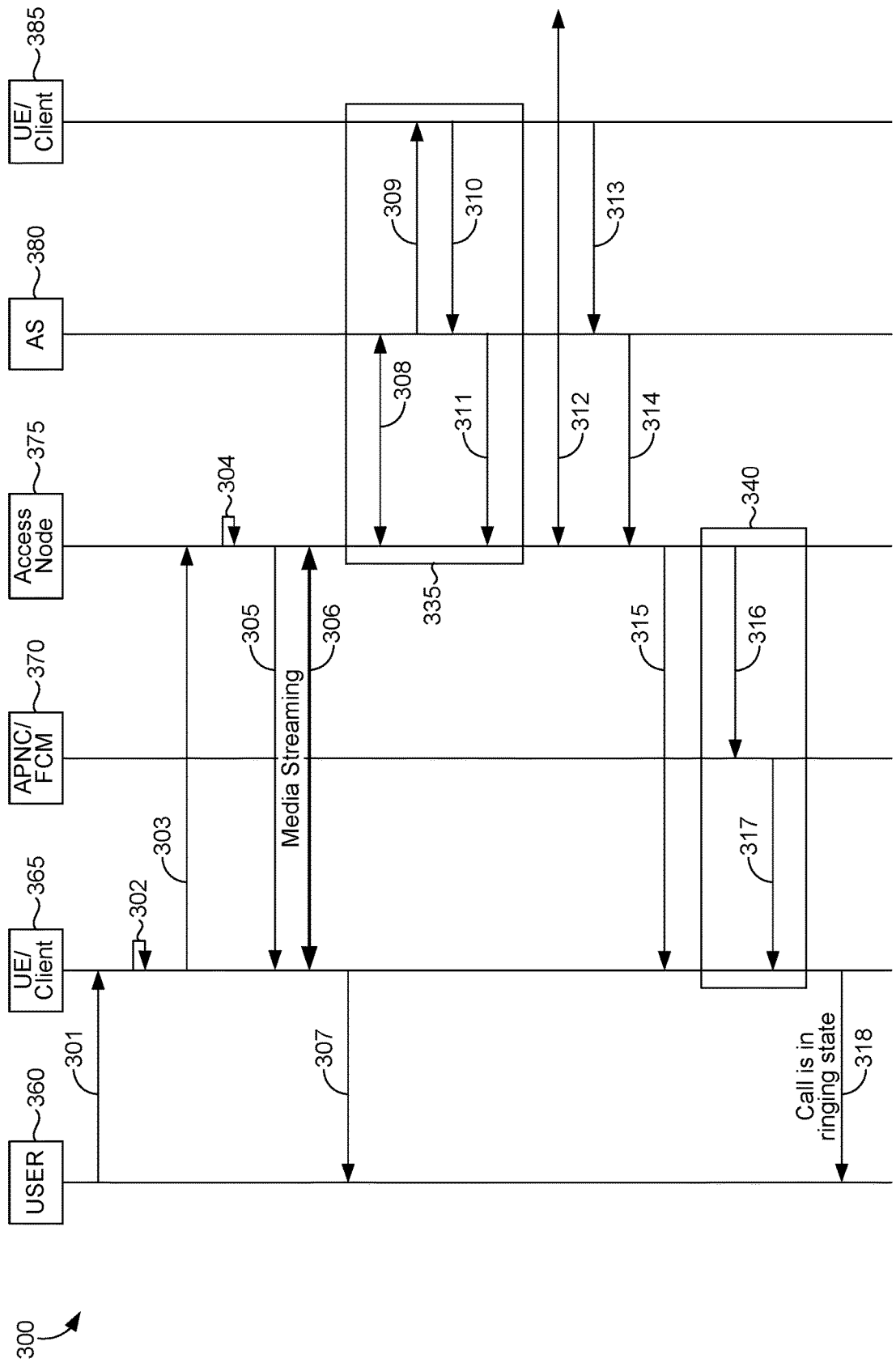
FIGS. 3A-3B illustrate a call flow diagram of an example call setup for a call between an originating client and a destination client, in accordance with certain embodiments.
Figure 3B:
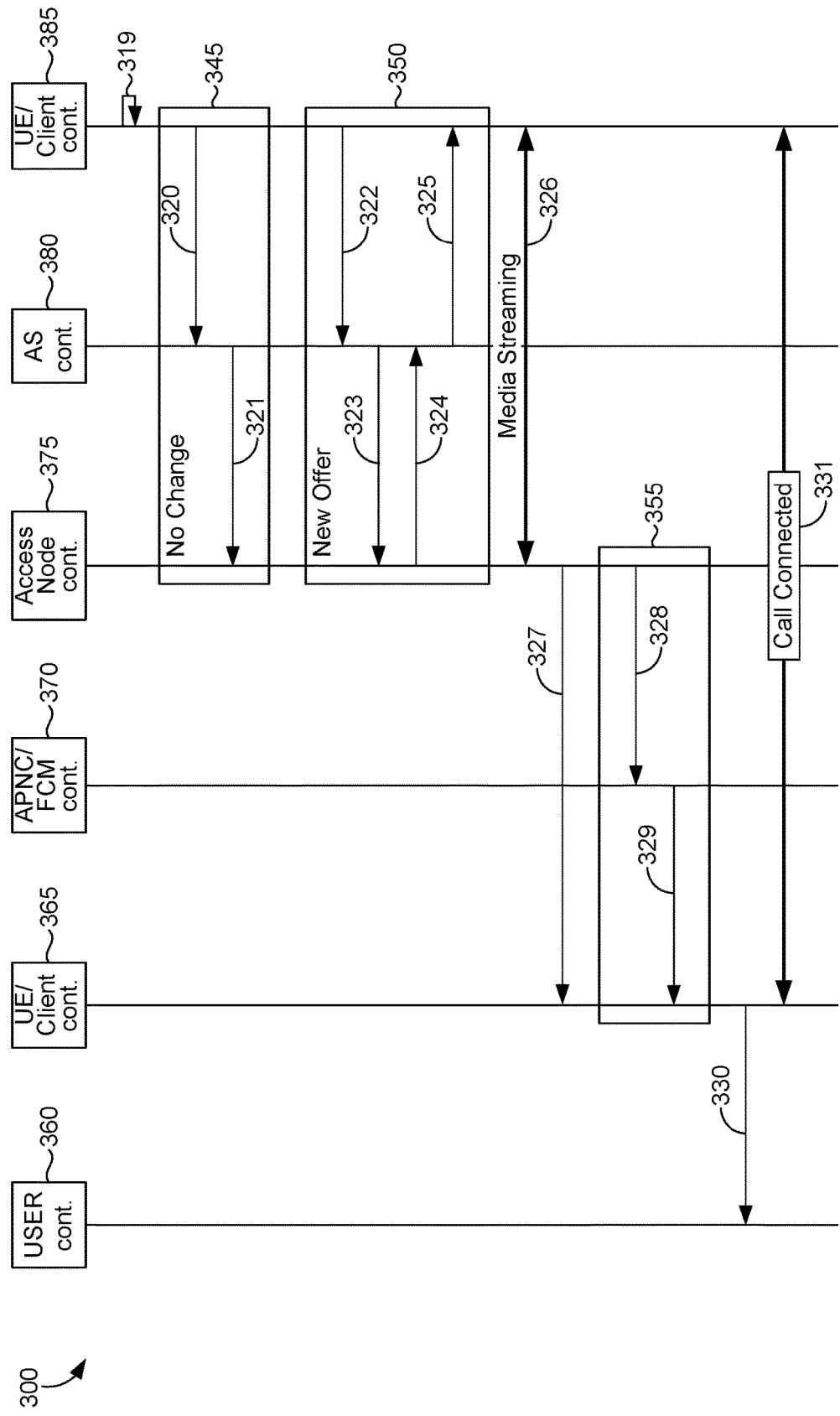

Turning now to FIGS. 3A-3B, FIGS. 3A-3B illustrate a call flow diagram of an example call setup for a call between an originating client and a destination client, in accordance with certain embodiments. More specifically, call flow 300 of FIGS. 3A-3B illustrates an example implementation using SDP to negotiate media characteristics for an Internet call or other streaming media session. Note that in other implementations, some other suitable technique for negotiating media characteristics that does not use SDP can be implemented. Furthermore, the interactions illustrated in call flow 300 need not be exhaustive, and other interactions may additionally or alternatively occur among the components illustrated in FIGS. 3A-3B and/or other components that are not illustrated.

In FIGS. 3A-3B, call flow 300 occurs among various components, including UE/client 365, Apple Push Notification service/Firebase Cloud Messaging for Android (APNS/FCM) 370, access node 375, application server 380, and UE/client 385. At a high level, UE/client 365 initiates an Internet call or other streaming media session with UE/client 385, access node 375 performs one or more call or connection setup functions, network 215 connects to and relays communications with UE/client 385, and APNS/FCM 370 provides notifications to UE/client 365. In some embodiments, UE/client 365 of FIGS. 3A-3B corresponds to originating internet client 115 of FIG. 1 and/or originating client 205 of FIG. 2, access node 375 of FIGS. 3A-3B corresponds to access node 140 of FIG. 1 and/or access node 210 of FIG. 2, application server 380 of FIGS. 3A-3B is associated with IMS 150 of FIG. 1 and/or network 215 of FIG. 2 (e.g., is a node, such as a central node or telephony application server of IMS 150 and/or network 215), and/or UE/client 385 of FIGS. 3A-3B corresponds to destination internet client 125 of FIG. 1.

At step 301, user 360 invokes an Internet call or other streaming media session on UE/client 365. For example, UE/client 365 may comprise a mobile application, such that user 360 clicks or taps a button or some other interaction element(s) to initiate a call. In another example, UE/client 365 comprises a smart speaker, and user 360 says a verbal command interpreted by an application associated with the smart speaker to initiate a call. Generally, any known technique for initiating a call may be implemented.

At step 302, UE/client 365 collects media information for a media stream. In an example implementation, step 302 includes Interactive Connectivity Establishment (ICE) candidate collection and creation of a media session (e.g., using SDP, using some other method or protocol that exchanges media characteristics). At step 303, UE/client 365 communicates a call initiation message (e.g., an SDP offer, some other message or communication that represents media characteristics) to access node 375 based on the collected media information. For example, the call initiation message may be sent through some sort of API (e.g., HTTP API, voice API, etc.) and may include some representation of one or more proposed media characteristics (e.g., media ports, open ports, destination IP address, audio codec, etc.) for a call or other media session between UE/client 365 and UE/client 385, including media characteristics supported by UE/client 365 and/or determined during step 301. At step 304, access node 375 collects and establishes local media resources (e.g., opens up a port and IP address on its interface), and at step 305, access node 375 communicates a call response message (e.g., HTTP 200/201, SDP answer, some other message or communication that represents media characteristics) to UE/client 365 based on the collected local media resources. For example, the call response message may include some representation of one or more proposed media characteristics (e.g., media ports, open ports, destination IP address, audio codec, bitrate, etc.) for the call or other media session between UE/client 365 and UE/client 385, including media characteristics supported by access node 375 and/or determined during step 304. In some cases, steps 303 and 304 occur once for a single offer/answer cycle. Upon the conclusion of this negotiation, at step 306, UE/client 365 and access node 375 open a first media stream using the negotiated media characteristics. In some cases, empty media packets can be streamed bi-directionally between UE/client 365 and access node 375 through the first media stream. At step 307, UE/client 365 presents a call initiated notification.

At step 308, upon opening first media stream between UE/client 365 and access node 375, access node 375 communicates a call invitation message (e.g., SIP INVITE, SDP offer, some other message or communication that represents media characteristics) targeting UE/client 385 to application server 380, which passes the call invitation message to the UE/client 385 at step 309. In response, at step 310, UE/client 385 communicates an invitation response message (e.g., SIP 183, SDP answer, some other message or communication that represents media characteristics) back to through application server 380, which communicates the invitation response message to access node 375 at step 311. In some cases, steps 308-311 form a process 335 that is repeated for multiple offer/answer cycles. In some embodiments, upon the conclusion of this negotiation between access node 375 and UE/client 385, access node 375 and UE/client 385 open up a second media stream through application server 380 using the negotiated media characteristics, and access node 375 connects the first and second media streams (e.g., in embodiments that use P-Early-Media). In some cases, at this point, the first stream can switch from using empty packets to valid packets. Additionally or alternatively, in some embodiments, access node 375 performs transcoding, for example, to facilitate the use of a desired codec for one of the streams. In some embodiments that use Policy and Charging Rules Function (PCRF) bearers, at step 312, access node 375 and the PCRF (not illustrated) may exchange corresponding AA-Request and AA-Answer messages.

In some cases, the current state of call flow 300 corresponds to a ringing state. Accordingly, at step 313, UE/client 385 communicates a ringing messaging (e.g., SIP 180) to application server 380, which passes the ringing message to access node 375 at step 314. In some embodiments, at step 315, a ringing notification is sent to UE/client 365 (e.g., over WebSocket or using some other protocol). Additionally or alternatively to step 315, one or more Push Notification Systems/Services can be used to deliver push notifications, as illustrated in alternative sub-process 340. For example, at step 316, access node 375 communicates a ringing notification message to APNS/FCM 370 (e.g., APNS for Apple devices, FCM for Android devices), and at step 317, APNS/FCM 370 communicates the ringing notification message to UE/client 365. At step 318, UE/client 365 causes some type of ringing notification to occur, such as an audible notification (e.g., a ringback tone), a visual notification, and/or some other notification.

At step 319, a user of UE/client 385 answers the call, the call goes to voicemail, or some other state change occurs. Upon UE/client 385 detecting a state change, depending on the update, UE/client 385 communicates a corresponding message (e.g., an HTTP 200 OK) to access node 375 via application server 380. Sub-processes 345 and 350 illustrate alternative scenarios that may occur. In sub-process 345, there is no proposed change to the media characteristics of the media stream. In an example implementation, at step 320, UE/client 385 communicates a response message (e.g., SIP 200 OK indicating the call invitation message of step 309 was successful) to application server 380, which passes the response message to access node 375 at step 321. In sub-process 350, there is a proposed change to the media characteristics of the media stream. In an example implementation, at step 322, UE/client 385 communicates a response message (e.g., 200 OK with a new SDP offer/SIP update serving as counteroffer to the call invitation message of step 309, some other message or communication that represents media characteristics) to application server 380, which passes the response message to access node 375 at step 323. In some cases, at step 324, access node 375 communicates a response message (e.g., 200 OK responding to the new SDP offer/SIP update of step 323, some other message or communication that represents media characteristics) to application server 380, which passes the response message to UE/client 385 at step 325. Note that the response message from steps 324 and 325 and the negotiations between access node 375 and UE/client 385 are based on local media information of access node 375, not based on (e.g., do not represent or contain any direct information about) the media interfaces or codecs used by UE/client 365.

In some cases, steps 322-325 of sub-process 350 are repeated for multiple offer/answer cycles. In some embodiments, upon the conclusion of this negotiation between access node 375 and UE/client 385, access node 375 and UE/client 385 open up a (new) second media stream through application server 380 using the negotiated media characteristics at step 326.

Note that sub-process 350 may occur upon the detection of one or more state changes. In the foregoing discussion, the relevant state change was described as a user answering a call, or the call going to voicemail. Additionally or alternatively, any number of state changes may trigger sub-process 350 to renegotiate and setup a new (updated) media stream between access node 375 and UE/client 385, such as a call transfer, a call being placed on hold or resumed, music-while-ringing being initiated or terminated, video being added or removed from a call, a call being forked onto multiple devices, and/or other scenarios.

Once a (new) second media stream has been opened at step 326, access node 375 connects the first and (new) second media streams (e.g., prior to step 227, at step 331). At step 327, a call connected notification is sent to UE/client 365 (e.g., over WebSocket or using some other protocol). Additionally or alternatively to step 327, one or more Push Notification Systems/Services can be used to deliver push notifications, as illustrated in alternative sub-process 355. For example, at step 328, access node 375 communicates a call connected notification message to APNS/FCM 370 (e.g., APNS for Apple devices, FCM for Android devices), and at step 329, APNS/FCM 370 communicates the call connected notification message to UE/client 365. At step 330, UE/client 365 causes some type of indication that notification that the call is connected, and at step 331 the call is connected.

Figure 4:
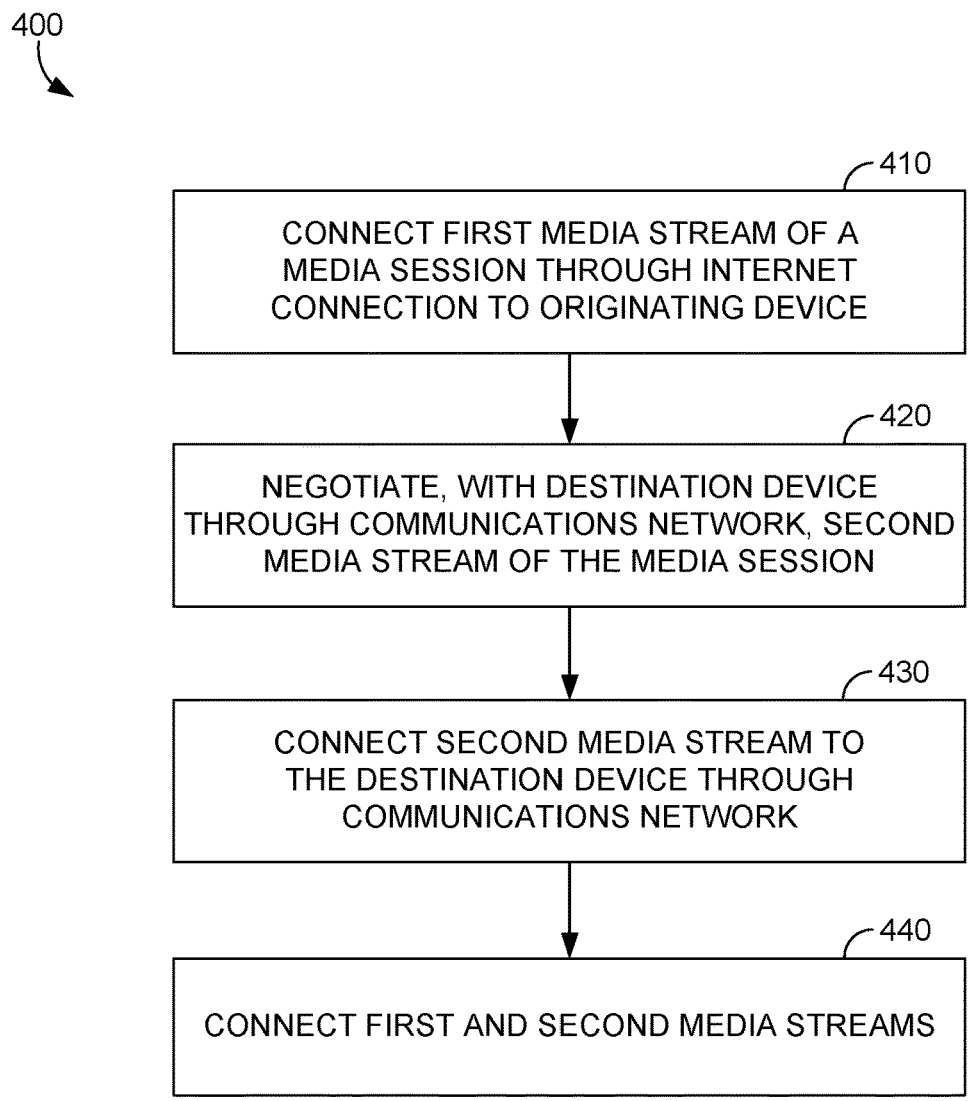
FIG. 4 illustrates a flow diagram of an example method for establishing a media session between an originating device and a destination device, in accordance with certain embodiments.

Turning now to FIG. 4, FIG. 4 illustrates a flow diagram of an example method 400 for establishing a media session between an originating device and a destination device, in accordance with certain embodiments. At a first step 410, a first media stream of a media session is connected through an internet connection to an originating device, for example, as described with respect to step 230 of FIG. 2 or step 306 of FIG. 3A. At a second step 420, a second media stream of the media session is negotiated with a destination device through a communications network, for example, as described with respect to steps 235-255 of FIG. 2, steps 308-311 of FIG. 3A, or steps 322-325 of FIG. 3B. At a third step 430, the second media stream is connected to the destination device through the communications network, for example, as described with respect to FIG. 2 (e.g., after the conclusion of steps 235 and 240, at step 260) or with respect to FIGS. 3A-3B (e.g., after the conclusion of steps 309-311, at step 326). At a fourth step, the first and second media streams are connected, for example, as described with respect to FIG. 2 (e.g., after the conclusion of steps 235 and 240, at step 265) or with respect to FIGS. 3A-3B (e.g., after the conclusion of steps 309-311, after the conclusion of step 326, at step 331).

Figure 5:
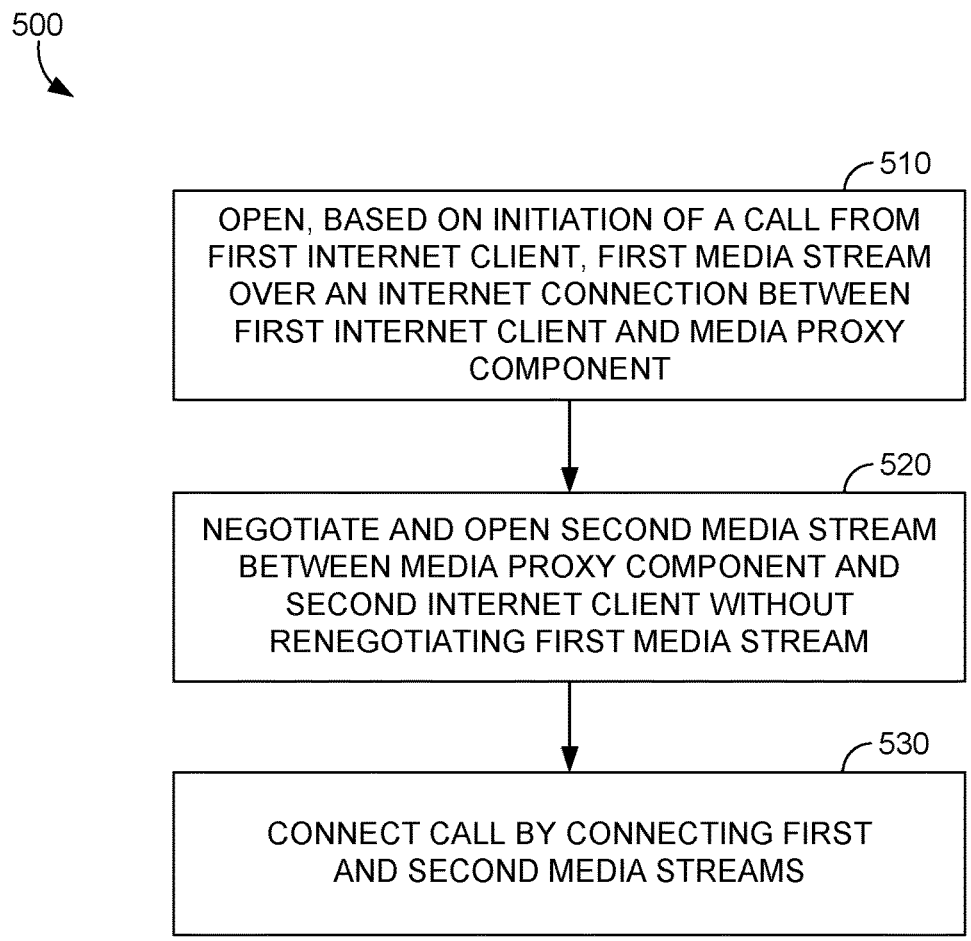
FIG. 5 illustrates a flow diagram of an example method for connecting a call between first and second internet clients, in accordance with certain embodiments.

Turning now to FIG. 5, FIG. 5 illustrates a flow diagram of an example method 500 for connecting a call between first and second internet clients, in accordance with certain embodiments. At a first step 510, a first media stream is opened over an internet connection between a first internet client and a media proxy component, based on an initiation of a call from the first internet client, for example, as described with respect to step 230 of FIG. 2 or step 306 of FIG. 3A. At a second step 520, a second media stream is negotiated and opened between the media proxy component and the second internet client without renegotiating the first media stream, for example, as described with respect to steps 235-255 of FIG. 2, steps 308-311 of FIG. 3A, or steps 322-325 of FIG. 3B. At a third step 530, the call is connected by connecting the first and second media streams, for example, as described with respect to FIG. 2 (e.g., after the conclusion of steps 235 and 240, at step 265) or with respect to FIGS. 3A-3B (e.g., after the conclusion of steps 309-311, after the conclusion of step 326, at step 331).

Figure 6:
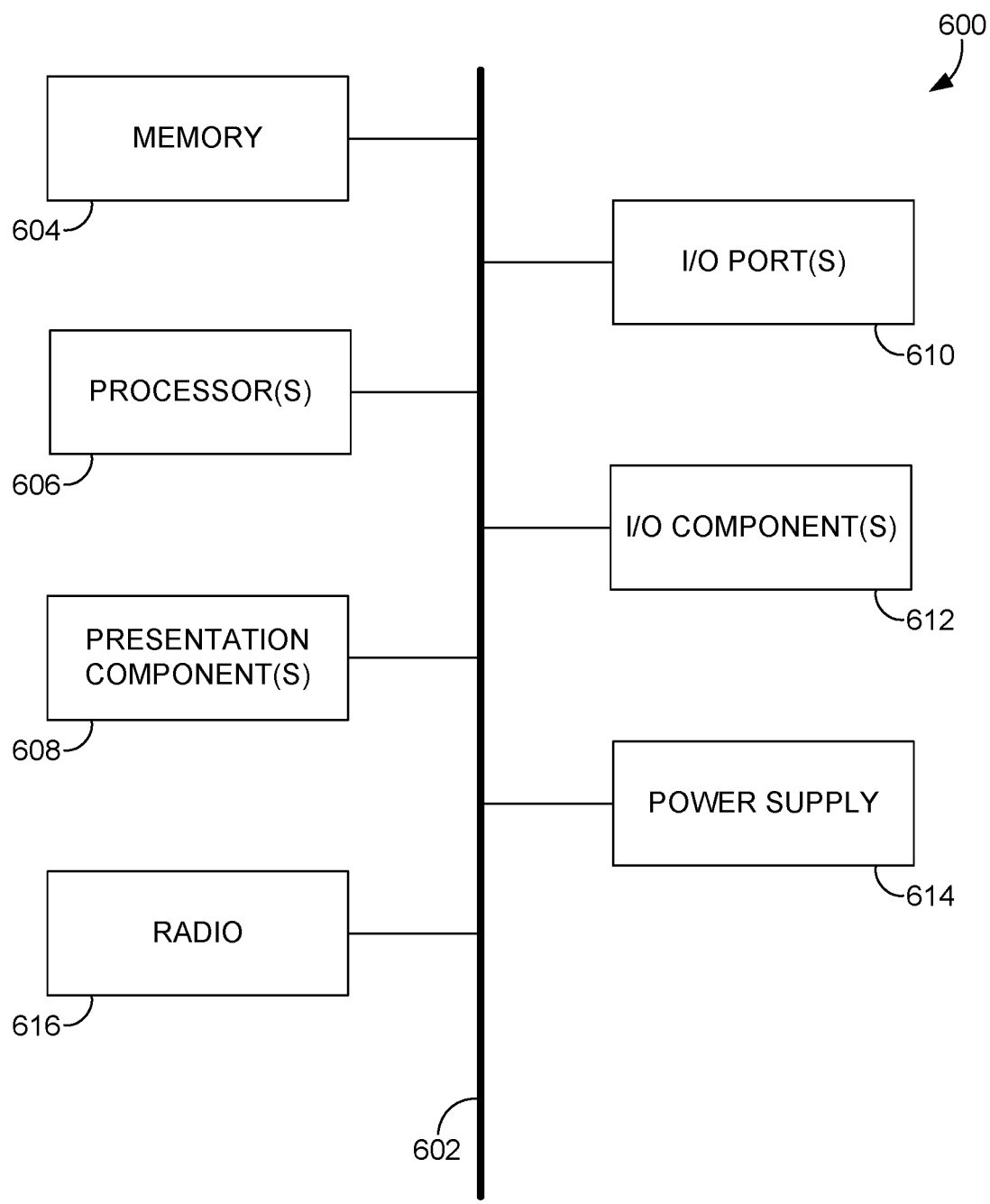
FIG. 6 illustrates an example computing device suitable for use in certain embodiments.

Turning now to FIG. 6, a diagram is depicted of an example computing environment suitable for use with implementations of the present disclosure. In particular, computer environment is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated. In aspects, the computing device 600 may be a UE, WCD, or other user device, capable of two-way wireless communications with an access point. Some non-limiting examples of the computing device 600 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 102 that directly or indirectly couples the following devices: memory 604, one or more processors 606, one or more presentation components 608, input/output (I/O) ports 610, I/O components 612, and power supply 614. Bus 102 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 612. Also, processors, such as one or more processors 606, have memory. The present disclosure hereof recognizes that such is the nature of the art, and reiterates that FIG. 6 is merely illustrative of an example computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 604 includes computer-storage media in the form of volatile and/or nonvolatile memory. Memory 604 may be removable, nonremovable, or a combination thereof. Example memory includes solid-state memory, hard drives, optical-disc drives, etc. Computing device 600 includes one or more processors 606 that read data from various entities such as bus 102, memory 604 or I/O components 612. One or more presentation components 608 presents data indications to a person or other device. Example one or more presentation components 608 include a display device, speaker, printing component, vibrating component, etc. I/O ports 610 allow computing device 600 to be logically coupled to other devices including I/O components 612, some of which may be built in computing device 600. Illustrative I/O components 612 include a microphone, joystick, game pad, satellite dish, scanner, printer, wireless device, etc.

Radio 616 represents a radio that facilitates communication with a wireless telecommunications network. In aspects, the radio 616 utilizes one or more transmitters, receivers, and antennas to communicate with the wireless telecommunications network on a first downlink/uplink channel. Though only one radio is depicted in FIG. 6, it is expressly conceived that the computing device 600 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 616 might additionally or alternatively facilitate other types of wireless communications including Wi-Fi, WiMAX, LTE, or other VoIP communications. As can be appreciated, in various embodiments, radio 616 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method comprising:
   establishing, based on an initiation of a call from a first internet client to a second internet client, a first media stream over an internet connection between the first internet client and a media proxy component;
   establishing a second media stream between the media proxy component and the second internet client;
   negotiating, in response to receiving a state change message from the second internet client, a modification to the second media stream without communicating the state change message to the first internet client, wherein the state change message comprises an update to the call that corresponds to a call transfer, a transition to or from music-while-ringing, a call hold or resume, or forking onto multiple devices; and
   connecting the call by the media proxy component connecting the first media stream and the second media stream.

2. The method of claim 1, further comprising masking the negotiating between the media proxy component and the second internet client from the first internet client.

3. The method of claim 1, wherein the negotiating of the second media stream is independent of capabilities of the first internet client.

4. The method of claim 1, further comprising, prior to negotiating the second media stream with the second internet client, negotiating the first media stream with the first internet client with a single offer and answer cycle.

5. The method of claim 1, further comprising maintaining the first media stream to the first internet client while replacing the second media stream to the second internet client with a replacement media stream associated with an update to the call.

6. The method of claim 1, wherein the negotiating between the media proxy component and the second internet client comprises one or more counteroffers that are not passed to the first internet client.

7. The method of claim 1, wherein establishing the second media stream comprises communicating a first session description protocol ("SDP") offer from the media proxy component to the second internet client.

8. The method of claim 7, wherein the state change message is a second SDP offer.

9. A system comprising:
one or more hardware processors; and
a media proxy component configured to use the one or more hardware processors to perform operations comprising:
establishing, based on an initiation of a call from a first internet client to a second internet client, a first media stream over an internet connection between the first internet client and the media proxy component;
establishing a second media stream between the media proxy component and the second internet client;
negotiating, in response to receiving a state change message from the second internet client, a modification to the second media stream without communicating the state change message to the first internet client, wherein the state change message comprises an update to the call that corresponds to a call transfer, a transition to or from music-while-ringing, a call hold or resume, or forking onto multiple devices; and
connecting the call by connecting the first media stream and the second media stream.

10. The system of claim 9, the operations further comprising masking the negotiating between the media proxy component and the second internet client from the first internet client.

11. The system of claim 9, wherein the negotiating of the second media stream is independent of capabilities of the first internet client.

12. The system of claim 9, the operations further comprising, prior to negotiating the second media stream with the second internet client, negotiating the first media stream with the first internet client with a single offer and answer cycle.

13. The system of claim 9, the operations further comprising maintaining the first media stream to the first internet client while replacing the second media stream to the second internet client with a replacement media stream associated with an update to the call.

14. The system of claim 9, wherein the negotiating between the media proxy component and the second internet client comprises one or more counteroffers that are not passed to the first internet client.

15. The system of claim 9, wherein establishing the second media stream comprises communicating a first SDP offer from the media proxy component to the second internet client.

16. The system of claim 15, wherein the state change message is a second SDP offer.

17. One or more non-transitory computer storage media storing computer-useable instructions that, when used by one or more computing devices, cause the one or more computing devices to perform operations comprising:
establishing, based on an initiation of a call from an originating device to a destination device, a first media stream between the originating device and an access node in communication with an internet protocol multimedia system ("IMS");
establishing a second media stream between the access node and the destination device through the IMS;
negotiating through the IMS of the second media stream, in response to receiving a state change message from the destination device, a modification to the second media stream without communicating the state change message to the originating device, wherein the state change message comprises an update to the call that corresponds to a call transfer, a transition to or from music-while-ringing, a call hold or resume, or forking onto multiple devices; and
connecting, by the access node, the call by connecting the first media stream and the second media stream.

18. The one or more non-transitory computer storage media of claim 17, the operations further comprising masking the negotiations between the access node and the destination device through the IMS from the originating device.

19. The one or more non-transitory computer storage media of claim 17, the operations further comprising maintaining the first media stream to the first internet client while replacing the second media stream to the second internet client with a replacement media stream associated with the update to the call.

20. The one or more non-transitory computer storage media of claim 17, wherein negotiating through the IMS comprises one or more counteroffers that are not passed to the first internet client.

* * * * *